United States Patent
Cho et al.

(10) Patent No.: US 12,299,292 B2
(45) Date of Patent: May 13, 2025

(54) APPARATUS AND METHOD WITH REMOTE PAGE ACCESS

(71) Applicant: SAMSUNG ELECTRONICS CO., LTD., Suwon-si (KR)

(72) Inventors: Sungduk Cho, Suwon-si (KR); Ruth Kim, Seoul (KR); Dong-Uk Ryu, Seongnam-si (KR); Jaewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 18/089,839

(22) Filed: Dec. 28, 2022

(65) Prior Publication Data

US 2023/0251780 A1 Aug. 10, 2023

(30) Foreign Application Priority Data

Jan. 25, 2022 (KR) ........................ 10-2022-0010928

(51) Int. Cl.
*G06F 3/06* (2006.01)

(52) U.S. Cl.
CPC ............ *G06F 3/0619* (2013.01); *G06F 3/065* (2013.01); *G06F 3/0683* (2013.01)

(58) Field of Classification Search
CPC ...... G06F 3/0619; G06F 3/065; G06F 3/0683; G06F 12/1009; G06F 12/1072; G06F 12/109; G06F 2212/1016; G06F 2212/2542; G06F 2212/657

See application file for complete search history.

(56) References Cited

U.S. PATENT DOCUMENTS

| 6,871,219 | B2 | 3/2005 | Noordergraaf et al. |
| 7,756,943 | B1* | 7/2010 | Wong ...................... G06F 9/544 709/212 |
| 2016/0085450 | A1* | 3/2016 | Ahn ........................ G06F 3/067 711/154 |
| 2023/0388371 | A1* | 11/2023 | Cheng ............... G06F 15/17331 |

FOREIGN PATENT DOCUMENTS

| EP | 0 780 769 B1 | 12/1996 |
| EP | 1 611 513 B1 | 4/2004 |
| JP | 2001-515244 A | 9/2001 |
| WO | WO 2020/190798 A1 | 9/2020 |
| WO | WO-2022170452 A1 * | 8/2022 ............. G06F 12/10 |

* cited by examiner

*Primary Examiner* — Jane W Benner

(74) *Attorney, Agent, or Firm* — NSIP Law

(57) ABSTRACT

An apparatus includes a memory configured to store data, and a processor. The processor configured to determine whether an access to the data is a local memory access; determine, based on a result of the determination of whether the access to the data is the local memory access, whether a page fault of the access occurred; determine, based on a result of the determination of whether the page fault occurred, whether the access is a remote access outside a socket; and perform, based on a result of the determination of whether the access is the remote access, the access to the data by copying the data onto a local memory.

18 Claims, 7 Drawing Sheets

APPARATUS AND METHOD WITH REMOTE PAGE ACCESS

CROSS-REFERENCE TO RELATED APPLICATIONS

This application claims the benefit under 35 USC § 119(a) of Korean Patent Application No. 10-2022-0010928, filed on Jan. 25, 2022, in the Korean Intellectual Property Office, the entire disclosure of which is incorporated herein by reference for all purposes.

BACKGROUND

1. Field

The following description relates to an apparatus and method with data processing.

2. Description of Related Art

A non-uniform memory access (NUMA) system has been adopted to alleviate bottlenecks in a symmetric multiprocessing (SMP) system. The NUMA system is one of the computer memory design methods used in a multiprocessor system, and the time to access a memory in the NUMA system may vary based on a relative position between the memory and a processor.

The NUMA system may have an efficient structure for parallel processing since memory access may be allowed for each node that configures the system. However, performance degradation may occur due to access through a link when a remote memory access between nodes or sockets configuring the system is performed. In addition, in the NUMA system, performance may be significantly affected by how much remote memory access latency may be minimized.

In Linux, various policies may be provided for efficiently using NUMA. A user may reduce remote memory access by modifying a NUMA policy based on a characteristic of an application.

A method of using a hybrid kernel is proposed to improve parallel performance. The performance may be improved through noiseless execution that uses a lightweight kernel, which uses a memory and a core isolated from a Linux system. However, in performing parallel processing using a many-core processor, performance may be degraded due to remote memory access by a NUMA node structure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes a memory configured to store data, and a processor. The processor configured to determine whether an access to the data is a local memory access; determine, based on a result of the determination of whether the access to the data is the local memory access, whether a page fault of the access occurred; determine, based on a result of the determination of whether the page fault occurred, whether the access is a remote access outside a socket; and perform, based on a result of the determination of whether the access is the remote access, the access to the data by copying the data onto a local memory.

The memory may be further configured to store the data based on a page table.

The processor may be further configured to perform, when the access is the local memory access, the local memory access, and determine, when the access is not the local memory access, whether the page fault occurred.

The processor may be further configured to generate a remote page table and a page table corresponding to a first node comprising the memory, and allocate a chunk memory for copying a remote page.

The processor may be further configured to perform, when the page fault has not occurred, the local memory access by reading the remote page table.

The processor may be further configured to: determine whether the access is a local memory access in a first node comprising the memory, or a remote memory access outside the first node; and determine whether the access is a remote memory access in a first socket comprising the first node, or a remote memory access to a second socket, outside the first socket.

The processor may be further configured to copy, when the access is a remote memory access to the second socket, a first page of a second node comprised in the second socket onto a remote memory chunk in the first node.

The processor may be further configured to: determine, in response to an additional remote access request for the first page, whether the first page has been copied based on a remote page table in the first node; and perform the local memory access based on whether the first page has been copied.

The processor may be further configured to copy the first page of the second node in a read sequence.

The processor may be further configured to update, when the access is the remote memory access outside the first socket, a remote page table with a physical memory address of a second node comprised in the second socket.

The processor may be configured to, perform, when the access is a remote memory access in the socket, the remote memory access to a node in the socket.

In another general aspect, a method includes determining whether an access to data stored in a memory is a local memory access; determining, based on a result of the determining whether the access to the data is the local memory access, whether a page fault of the access occurred; determining, based on whether the page fault occurred, whether the access is a remote access outside a socket; and performing, based on a result of the determining whether the access is the remote access outside the socket, the access to the data by copying the data onto a local memory.

The data may be stored based on a page table.

The determining of whether the page fault occurred may include performing, when the access is the local memory access, the local memory access; and determining, when the access is not the local memory access, whether the page fault occurred.

The method may further include generating a remote page table and a page table corresponding to a first node comprising the memory, and allocating a chunk memory for copying a remote page.

The determining of whether the access is the remote access may include performing, when the page fault has not occurred, the local memory access by reading the remote page table.

The determining of whether the access is the remote access may further include determining whether the access is a local memory access in a first node comprising the memory, or a remote memory access outside the first node; and determining whether the access is a remote memory access in a first socket comprising the first node, or a remote memory access to a second socket, outside the first socket.

The determining of whether the access is the remote access may further include copying, when the access is a remote memory access to the second socket, a first page of a second node comprised in the second socket onto a remote memory chunk in the first node.

The performing of the access to the data may include determining, in response to an additional remote access request for the first page, whether the first page has been copied based on a remote page table in the first node; and performing the local memory access based on whether the first page has been copied.

The copying may be performed in a read sequence.

The determining of whether the access is the remote access may further include updating, when the access is a remote memory access outside the first socket, a remote page table with a physical memory address of the second node comprised in the second socket.

The determining of whether the access is the remote access may further include performing, when the access is a remote memory access in the socket, a remote memory access to a node in the socket.

In another general aspect, an apparatus includes a processor configured to: determine, when a requested access is not a local memory access, whether a page fault of the requested access occurred; determine, when the page fault of the requested access occurs, whether the requested access is a remote memory access outside a socket; and allocate, when the requested access is the remote memory access outside the socket, a local memory to a remote chunk area for copying a remote page, and perform the remote memory access.

The processor may be further configured to: update, when the requested access is the remote memory access outside the socket, a remote page table with a physical memory address of a node comprised in another socket.

Other features and aspects will be apparent from the following detailed description, the drawings, and the claims.

Figure 1:
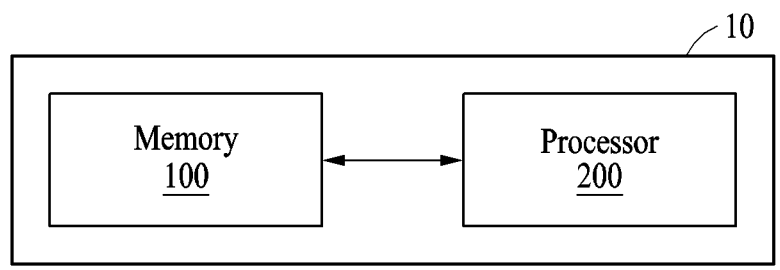
FIG. 1 illustrates an example of a data processing apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains and after an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like elements and a repeated description related thereto will be omitted.

A module in the present disclosure may be hardware that may perform functions and operations according to the disclosure, may be computer program code that may perform a predetermined function and operation, or may be an electronic recording medium in which computer program code that may perform a predetermined function and operation is installed, for example, a processor or a microprocessor.

In other words, the module may be hardware for performing the idea and the technical scope of the disclosure, a functional and/or structural combination of software performing the hardware.

FIG. 1 illustrates an example of a data processing apparatus.

Referring to FIG. 1, a data processing apparatus 10 may process data. The data may be symbolic or numeric data in a form to operate a computer system. The data processing apparatus 10 includes a memory 100 and a processor 200.

The data processing apparatus 10 may control an access method for data stored in the memory 100. The data processing apparatus 10 may reduce a memory access cost by controlling the memory access method. The data processing apparatus 10 may reduce the memory access cost for data by copying a page corresponding to stored data to a local memory. The page may be a block having a predetermined size in a method of operating a virtual memory apparatus by configuring in a plurality of blocks. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The memory 100 may store data for an operation or an operation result. The memory 100 stores instructions (or programs) executable by the processor 200. For example, the instructions include instructions for performing the operation of the processor 200 and/or an operation of each component of the processor 200.

The memory 100 may be implemented as a volatile or non-volatile memory device.

The volatile memory device may be implemented as dynamic random-access memory (DRAM), static random-access memory (SRAM), thyristor RAM (T-RAM), zero capacitor RAM (Z-RAM), or twin transistor RAM (TTRAM).

The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, or insulator resistance change memory.

The memory 100 may store data. The memory 100 may store data based on a page table. The page table may be a table storing information related to a page. The page table may have a page number as an index, and may include a start address of a physical memory allocated to a page.

The processor 200 may process data stored in the memory 100. The processor 200 may execute computer-readable code (for example, software) stored in the memory 100 and instructions triggered by the processor 200.

The processor 200 may be a data processing device implemented by hardware, including a circuit having a physical structure to perform desired operations. For example, the desired operations may include code or instructions in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 200 may determine whether access to data is a local memory access. The local memory access may be an access to a memory in a node.

The processor 200 may determine whether a page fault of the access to the data has occurred based on whether the access is a local memory access. The page fault may occur when a program attempts to access data or code that may exist in its address space but not exist in RAM of the system.

When the access to the data is a local memory access, the processor 200 may perform the local memory access. When the access is not local memory access, the processor 200 may determine whether a page fault has occurred.

The processor 200 may determine whether the access is a remote access outside a socket, based on whether the page fault has occurred. When the page fault has not occurred, the processor 200 may perform the local memory access by reading a remote page table.

The processor 200 may perform the access to the data by copying the data onto a local memory based on whether the access is a remote access outside the socket.

When a memory access is a remote memory access in the socket, the processor 200 may perform the remote memory access to a node in the socket.

The processor 200 may determine whether an access is a local memory access in a first node including the memory 100 or a remote memory access outside the first node. The processor 200 may determine whether the access is a remote memory access in a first socket, including the first node, or a remote memory access to a second socket, which is outside the first socket.

When the access is a remote memory access to the second socket, the processor 200 may copy a first page of the second node included in the second socket onto a remote memory chunk in the first node.

When the access to the data is a remote memory access outside the first socket, the processor 200 may update a remote page table with a physical memory address of the second node included in the second socket.

The processor 200 may generate a remote page table and a page table corresponding to the first node, including the memory 100. The processor 200 may perform chunking by allocating a chunk memory for copying a remote page.

When the processor 200 additionally receives a remote access request for the first page, the processor 200 may determine whether the first page has been copied, based on the remote page table in the first node. The processor 200 may perform a local memory access based on whether the first page has been copied.

Copying may be performed in a read sequence.

Figure 2:
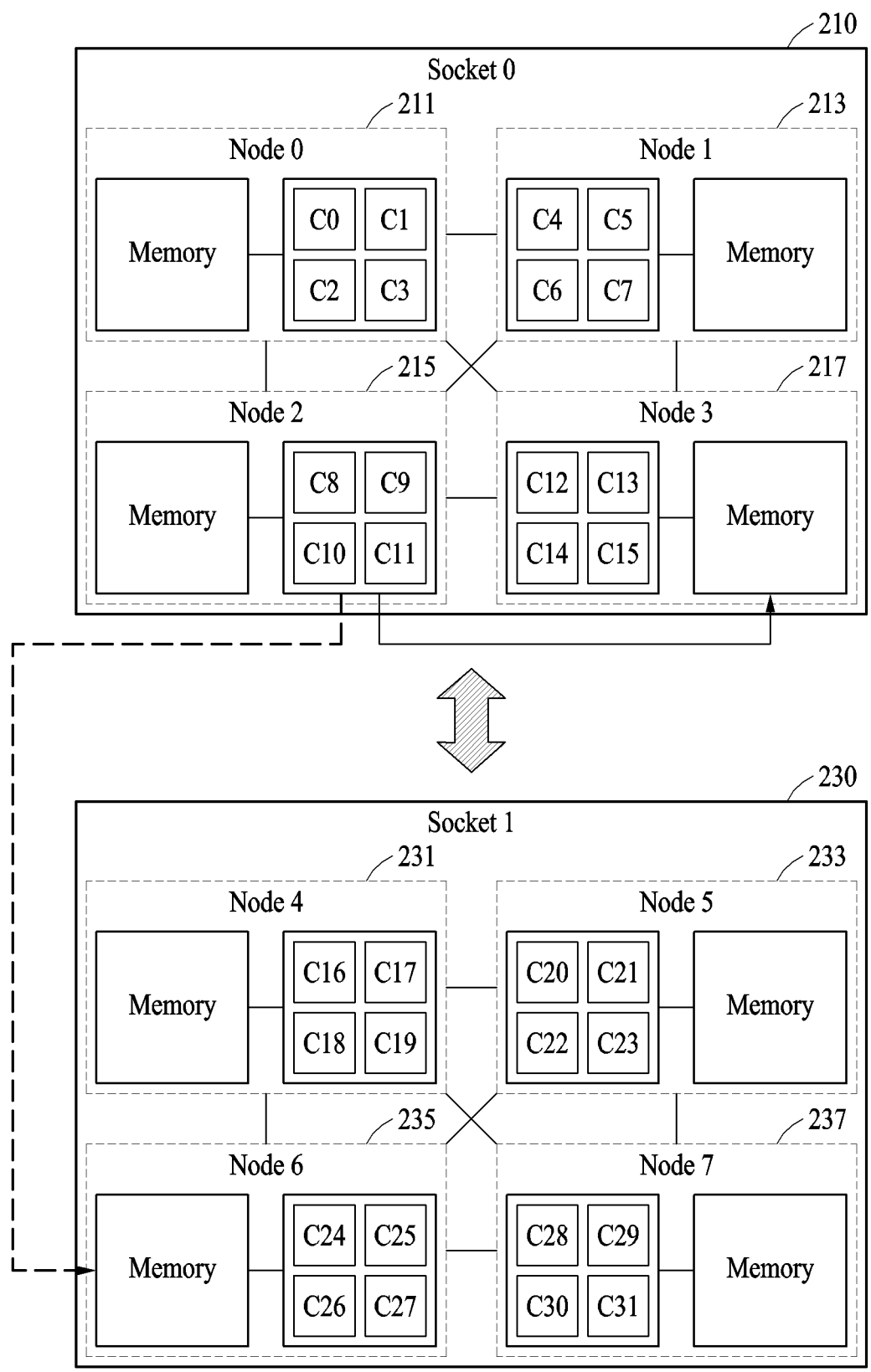
FIG. 2 illustrates an example of a memory access to in or outside a socket.
Figure 3:
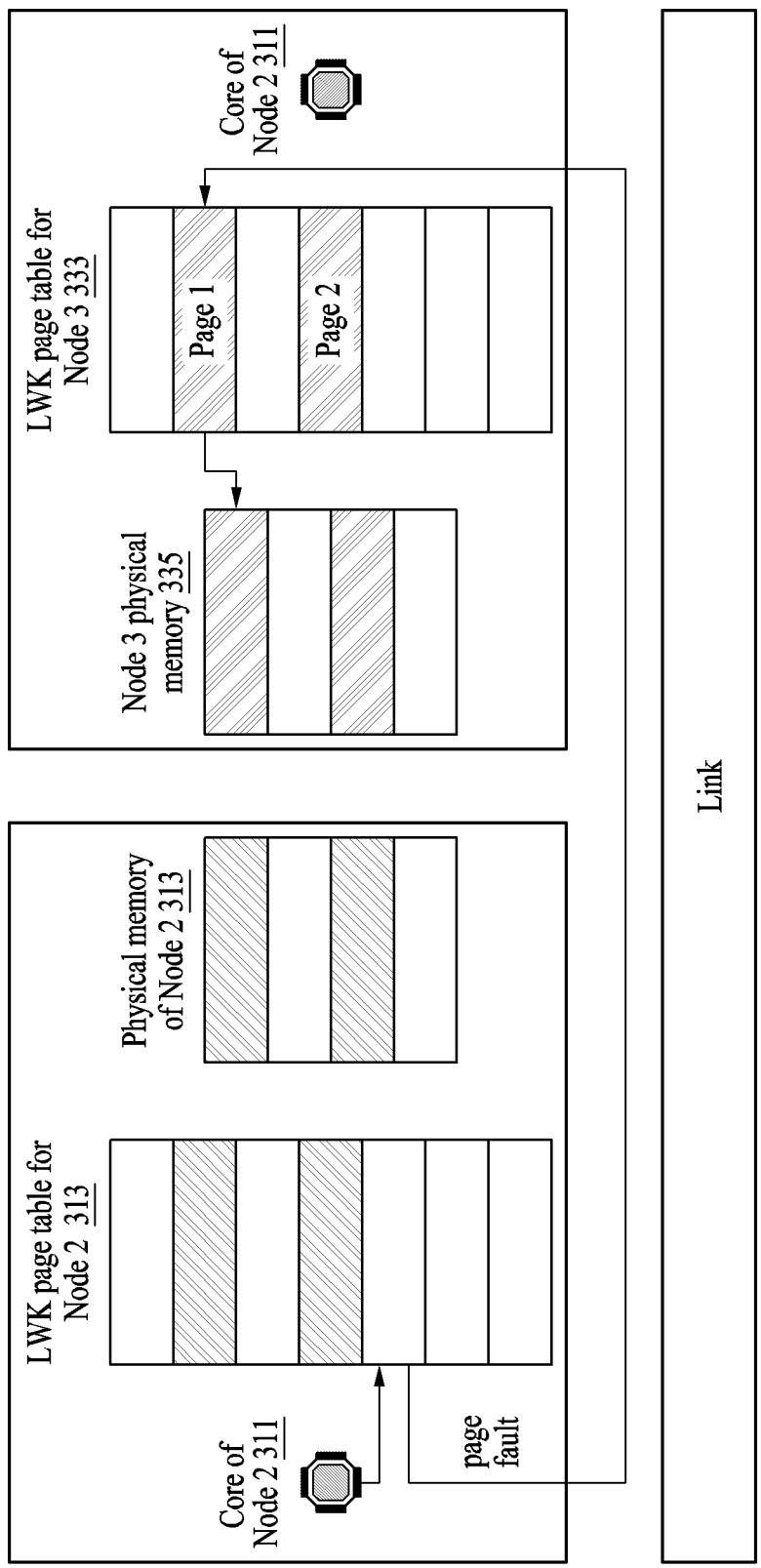
FIG. 3 illustrates an example of an operation of performing a remote memory access in a socket.
Figure 4A:
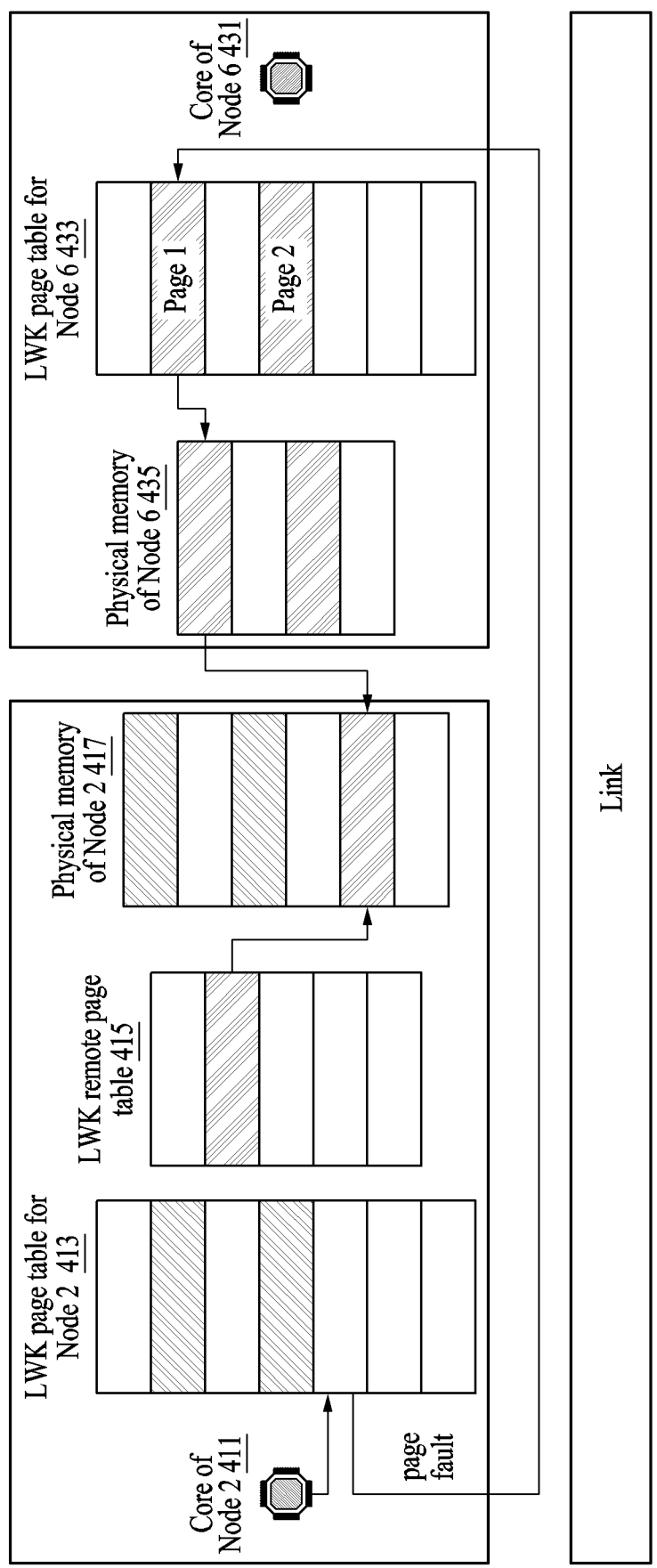
FIGS. 4A and 4B illustrate examples of an operation of performing a remote memory access outside a socket.
Figure 4B:
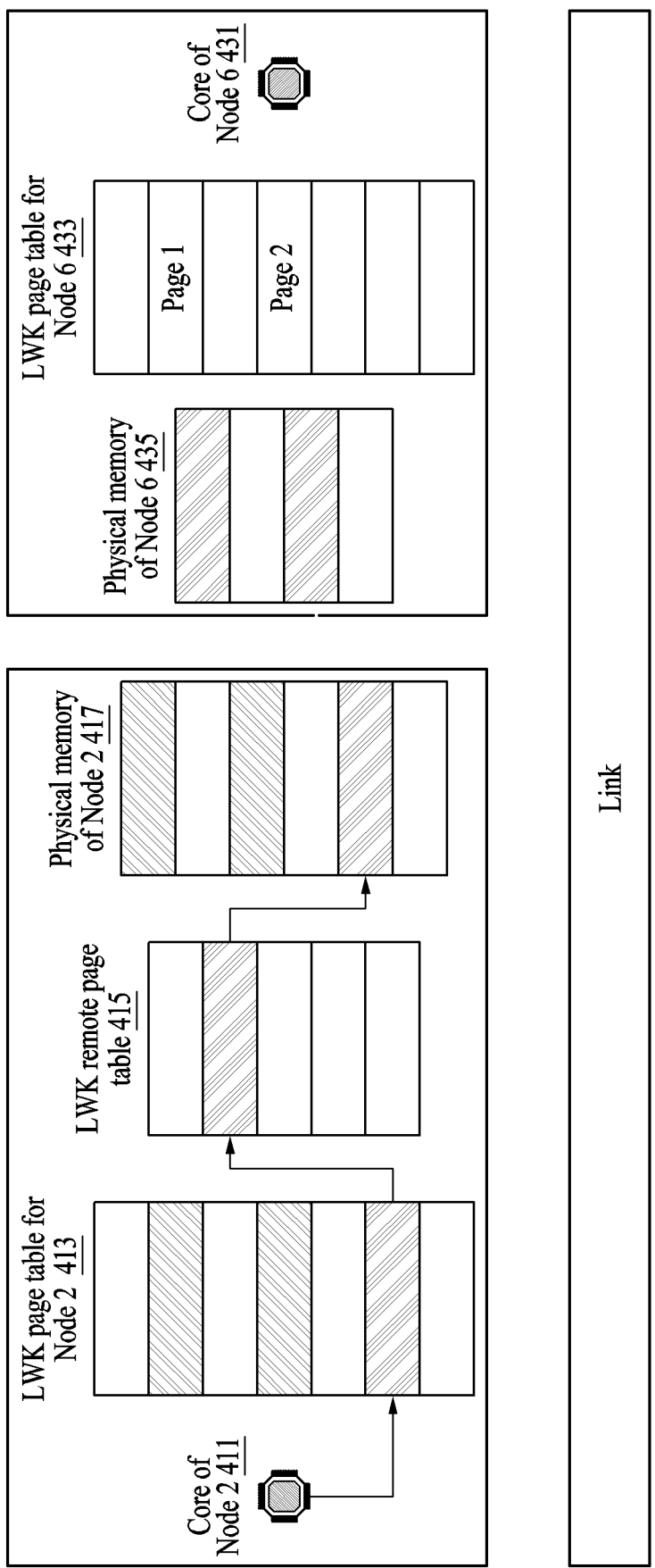

FIG. 2 illustrates an example of memory access in or outside a socket, FIG. 3 illustrates an example of an operation of performing remote memory access in a socket, and FIGS. 4A and 4B illustrate examples of an operation of performing a remote memory access outside a socket.

Referring to FIGS. 2 to 4B, in a data processing system (for example, a NUMA) including a plurality of sockets, a processor (for example, the processor 200 of FIG. 1) may improve memory performance by minimizing remote memory accesses between sockets. The processor 200 may minimize remote memory accesses and improve the memory performance by performing page copying in a light weight kernel (LWK).

To perform an LWK application program, a core, and a memory (for example, the memory 100 of FIG. 1) allocated by an operating system (for example, Linux) may be used. Since memory access speed is fast when performing local memory access in the same node, when receiving a resource, the processor 200 may use the resource by receiving the resource from the same node, if possible.

However, since many cores are used in multi-threading, performance may drop due to remote memory access to a different node or a memory outside the socket. The remote memory access outside the socket may require a higher memory access cost than the remote memory access in the socket. In addition, frequent remote page copying in the socket may degrade the performance of the data processing system.

When a remote memory access occurs in a read sequence that reads data, the processor 200 may determine whether the remote access is an access in the socket or an access outside the socket. By copying a remote memory page onto a local memory page only in a case when the remote access is a remote memory access outside the socket, when performing an additional access for a page, which is the same as the copied page, the processor 200 may perform the local memory access by reading the copied page from the local memory area. In other words, the processor 200 may improve the performance of the data processing system by reducing an additional memory access cost by copying the remote memory page onto the local memory page.

To perform page copying in the LWK, the processor 200 may additionally generate a remote page table while generating a page table of a memory area by receiving the memory 100 from the operating system. Since the processor 200 may receive the memory 100 for each node, the processor 200 may generate a remote page table for each node when generating a page table for each node. In one node, the memory 100 may be allocated by in units of a plurality of chunks. The processor 200 may additionally receive a chunk for a remote memory in a node, which may perform page copying.

Two types of memory accesses may occur when running an application program in the LWK. One may be a local memory access in a node, and the other may be a remote memory access outside the node. The local memory access using the core and the memory 100 in the node may be performed without modification, and when performing the remote memory access that the core accesses a memory outside the node, a page fault may occur and the memory outside the node may be accessed via a link.

The remote memory access outside the node may include two methods. One may be a remote memory access in a socket, and the other may be a remote memory access outside the socket.

When performing the remote memory access outside the socket, the processor 200 may copy a page of an external node, which the processor 200 attempts to access, onto a remote memory chunk in a node in which the core is included. The processor 200 may update a remote page table of the LWK with a physical memory address.

In response to an additional request for a remote access to the copied page, the processor 200 may determine whether the page has been copied by identifying the remote page table in the node, and when the page has been copied, the processor 200 may perform a local memory access.

When performing page copying in a reading operation, an operation of page copying may be performed only in a read sequence, and may not be performed in a write sequence, since the performance may be degraded since data of the memory chunk and the remote memory may need to be modified together.

When performing page copying, the number of pages may be modified depending on a characteristic of an application program. For example, when a large quantity of data to be read is present, the processor 200 may improve performance by copying a plurality of pages when a page fault has occurred.

The data processing system may include a plurality of sockets. The data processing system may include Socket 0 210 and Socket 1 230. Each socket may include a plurality of nodes. Socket 0 210 may include a plurality of nodes. The Socket 0 210 may include Node 0 210, Node 1 213, Node 2 215, and Node 3 217, and the Socket 1 230 may include Node 4 231, Node 5 233, Node 6 235, and Node 7 237. Each node may include a memory and one or more processors.

The processor 200 may determine whether an access to data is a local memory access. The local memory access may be an access to a memory in a node.

The processor 200 may determine, based on whether the access is a local memory access, whether a page fault of the access to the data has occurred.

When the access to the data is a local access, the processor 200 may perform the local memory access. When the access is not local access, the processor 200 may determine whether a page fault has occurred.

The processor 200 may determine whether the access is a remote access outside a socket, based on whether the page fault has occurred. When the page fault has not occurred, the processor 200 may perform the local memory access by reading a remote page table.

The example of FIG. 3 may show a case of performing remote memory access in the socket, as illustrated by a solid line arrow in FIG. 2. In the example of FIG. 3, a page fault may occur since data that a core 311 attempts to access is not in a page table 313 for Node 2 and a physical memory 313 for Node 2.

When the processor 200 performs a remote memory access where the core 311 corresponding to Node 2 accesses a memory (for example, the memory of Node 3 217 of FIG. 2) outside a node (for example, Node 2 215 of FIG. 2), a page fault may occur and the memory of the external node (for example, Node 3 217 of FIG. 2) may be accessed via a link. The processor 200 may access a physical memory 335 of Node 3 217 through a page table 333 of Node 3 217.

FIGS. 4A and 4B may be a memory access illustrated by a dashed line arrow in FIG. 2.

The processor 200 performs an access to data by copying the data onto a local memory based on whether the access is remote access outside a socket.

The processor 200 may determine whether the access is a local memory access in a first node including the memory 100 or a remote memory access outside the first node.

In the example of FIG. 2, the processor 200 may determine whether an access to data is a remote memory access in a first socket (for example, Socket 0 210), including a first node (for example, Node 2 215), or a remote memory access to a second socket (for example, Socket 1 230), which is outside the first socket.

When the access is a remote memory access to the second socket, the processor 200 may copy a first page of the second node (for example, Node 6 235) included in the second socket onto a remote memory chunk in the first node.

When the access to the data is a remote memory access outside the first socket, the processor 200 may update a remote page table with a physical memory address of the second node included in the second socket.

In the example of FIG. 4A, when a core 411 of Node 2 215 attempts to access data, which is not on a page table 413 of Node 2, the processor 200 may update a remote page table 415 of Node 2 with an address of a physical memory 435 of Node 6 through a page table 433 of the Node 6 235, and may copy data of the physical memory 435 of Node 6 onto a physical memory 417 of Node 2.

The processor 200 may generate a remote page table and a page table corresponding to the first node, including the memory 100. The processor 200 may allocate a chunk memory for copying a remote page.

When the processor 200 additionally receives a remote access request for the first page, the processor 200 may determine whether the first page has been copied, based on the remote page table in the first node. The processor 200 may perform a local memory access based on whether the first page has been copied.

In example of FIG. 4B, when of receiving an additional request for access to copied data, which is copied onto the physical memory 417 of Node 2, the processor 200 may determine whether the data has been copied based on the remote page table 415 of Node 2 215, and may perform local memory access when the data is the copied data onto the physical memory 417 of Node 2.

Figure 5:
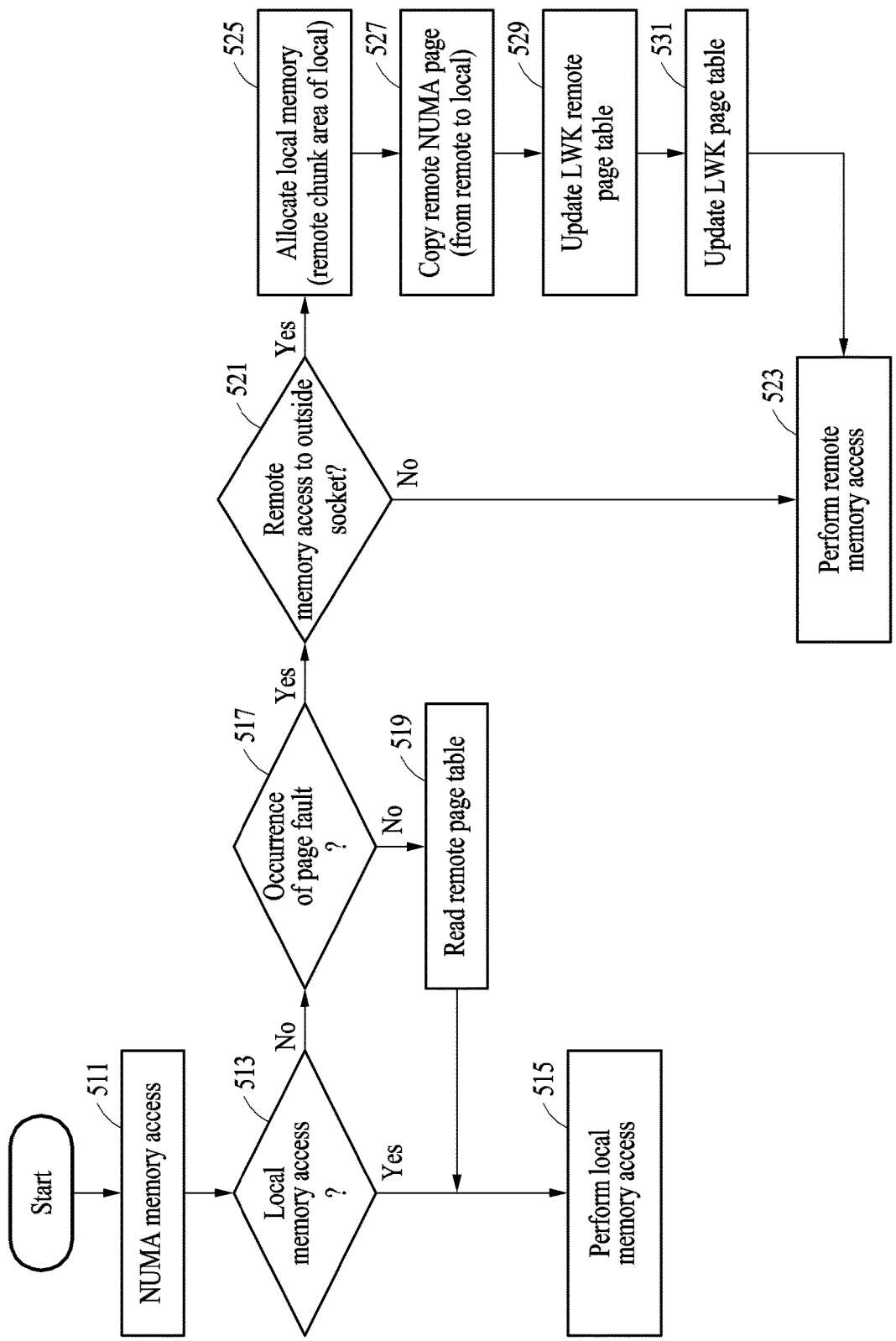
FIG. 5 illustrates an example of an operation of processing a memory access.

FIG. 5 illustrates an example of an operation of processing a memory access.

Referring to FIG. 5, the flowchart of FIG. 5 may be a flowchart, configured in a socket structure, of when remote memory access has occurred between sockets in a NUMA node. When a processor, (for example, the processor 200 of FIG. 1) copies a page of the remote memory onto a memory in a local node, and then receives a remote memory access request for the same page, the processor 200 may access the memory in the same method as the local memory access by referring to a remote page table in the local node In operation 511, the processor 200 may receive a request for access (for example, NUMA memory access) to data. In operation 513, the processor 200 may determine whether the access is a local memory access. In operation 515, the processor 200 may perform the local memory access when the access is a local memory access.

In operation 517, when the access is not a local memory access, the processor 200 may determine whether a page fault has occurred. In operation 519, when the page fault has not occurred, the processor 200 may read a remote page table. In operation 515, the processor 200 may perform the local memory access by reading the remote page table.

In operation 521, when the page fault has occurred, the processor 200 may determine whether the access to the data is a remote memory access outside a socket. In operation 523, when the access to the data is not a remote memory access outside the socket, the processor 200 may perform a remote memory access.

In operation 525, when the access to the data is a remote memory access outside the socket, the processor 200 may allocate a local memory to a remote chunk area. In operation 527, the processor 200 may copy a remote NUMA page from the remote memory onto the local memory. In operation 529, the processor 200 may update an LWK remote page table. In operation 531, the processor 200 may update an LWK page table. In operation 523, the processor 200 may perform the remote memory access based on the updated page table.

Through the data processing process described above, the processor 200 may prevent frequent page copying by performing, without modification, a remote memory access in the socket of which a memory access cost is relatively low, and may alleviate performance degradation due to iterative remote memory accesses between sockets of which a memory access cost is relatively high.

In other words, since the remote memory access outside the socket has a high latency, the processor 200 may efficiently perform a memory access by performing remote page copying, by determining whether an access is a remote memory access outside the socket of which a memory access cost is high.

Figure 6:
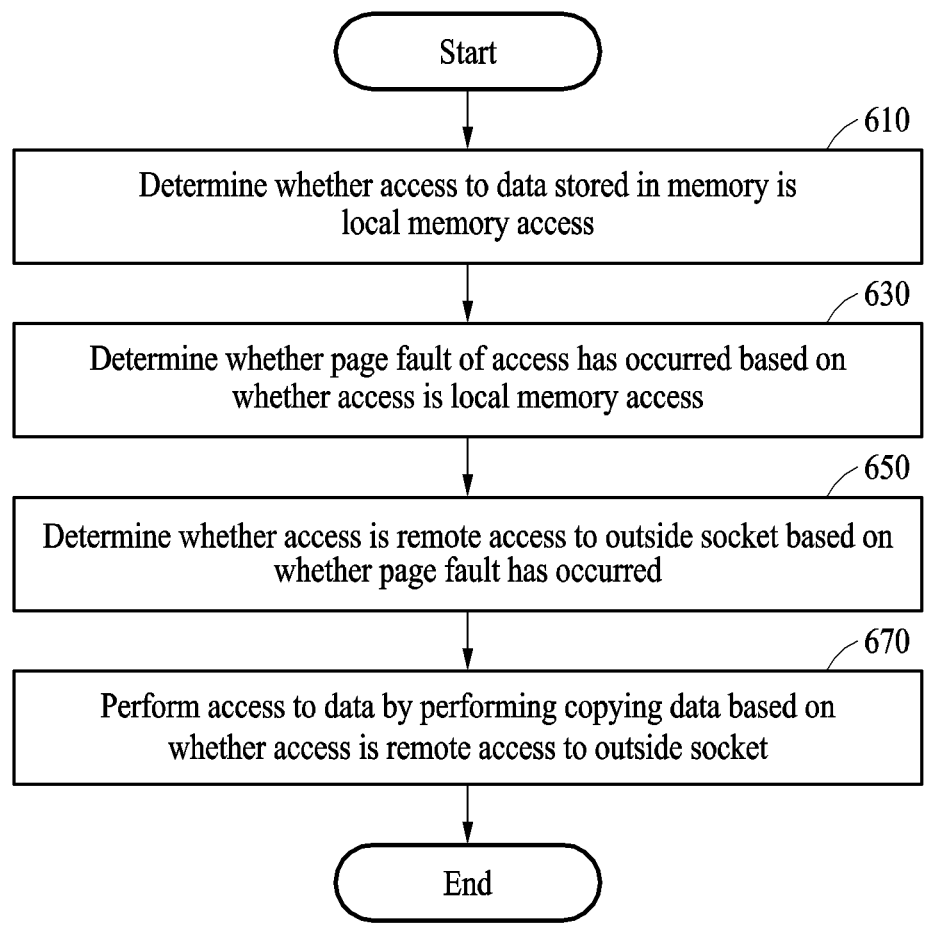
FIG. 6 illustrates an example of an operation of the data processing apparatus of FIG. 1.

FIG. 6 illustrates an example of an operation of the data processing apparatus of FIG. 1.

Referring to FIG. 6, in operation 610, a processor (for example, the processor 200 of FIG. 1) may determine whether an access to data is a local memory access.

In operation 630, the processor 200 may determine whether a page fault of the access to the data has occurred based on whether the access is a local memory access.

When the access to the data is a local access, the processor 200 may perform the local memory access. When the access is not a local access, the processor 200 may determine whether a page fault has occurred.

In operation 650, the processor 200 may determine whether the access is a remote access outside a socket, based on whether the page fault has occurred. When the page fault has not occurred, the processor 200 may perform the remote local memory access by reading a remote page table.

In operation 670, the processor 200 may perform the access to the data by copying the data onto a local memory based on whether the access is a remote access outside a socket.

When a memory access is a remote memory access in the socket, the processor 200 may perform the remote memory access to a node in the socket.

The processor 200 may determine whether the access is a local memory access in a first node, including the memory 100 or a remote memory access outside the first node. The processor 200 may determine whether the access is a remote memory access in a first socket including the first node or a remote memory access to a second socket, which is outside the first socket.

When the access is a remote memory access to the second socket, the processor 200 may copy a first page of the second node included in the second socket onto a remote memory chunk in the first node.

When the access to the data is a remote memory access outside the first socket, the processor 200 may update a remote page table with a physical memory address of the second node included in the second socket.

The processor 200 may generate a remote page table and a page table corresponding to the first node including the memory 100. The processor 200 may allocate a chunk memory for copying a remote page.

When the processor 200 additionally receives a remote access request for the first page, the processor 200 may determine whether the first page has been copied, based on the remote page table in the first node. The processor 200 may perform a local memory access based on whether the first page has been copied.

The copy may be performed in a read sequence.

As a non-exhaustive example only, an apparatus, data processing apparatus, and data processing system as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The apparatus, data processing apparatus and data processing system in FIGS. 1-6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus comprising:
   a memory configured to store data, the memory comprising a non-uniform memory access (NUMA) memory, wherein some of the NUMA memory is provided in a first memory of a first NUMA node comprised in a first NUMA socket, and wherein some of the memory is provided in a second memory of a second NUMA node comprised in a second NUMA socket; and
   a processor configured to:
      determine whether an access of the first NUMA node to access the data is a local memory access;
      based on a result of the determination of whether the access to the data is a local memory access, determine whether a page fault of the access occurred;
      based on a result of the determination of whether a page fault occurred, determine whether the access is a remote access outside the first NUMA socket; and
      based on a result of the determination of whether the access is a remote access outside the first NUMA socket, perform the access to the data by copying the data from the second memory into the first memory.

2. The apparatus of claim 1, wherein the memory is further configured to store the data based on a page table.

3. The apparatus of claim 1, wherein the processor is further configured to:
   perform, when the access is determined to be a local memory access, the local memory access; and
   determine, when the access is determined to not be a local memory access, whether the page fault occurred.

4. The apparatus of claim 1, wherein the processor is further configured to, to satisfy the access:
   generate an entry in a remote page table and an entry in a page table, wherein the remote page table and the page table both correspond to the first NUMA node; and
   allocate a chunk of the first memory of the first NUMA node and copy into the chunk a remote page containing the data.

5. The apparatus of claim 4, wherein the processor is further configured to:
   receive a second access to the data;
   in response to the second access to the data, access the data from the chunk of physical memory based on the entry in the remote page table and based on the entry in the page table.

6. The apparatus of claim 1, wherein the processor is further configured to:
   copy, when the access is determined to be a remote memory access to the second NUMA socket, a first page of the second NUMA node onto a remote memory chunk in the first memory of the first NUMA node that is configured to store copies of remote pages.

7. The apparatus of claim 6, wherein the processor is further configured to:
   in response to an additional request of the first NUMA node to access the data corresponding to the first page, determine whether the first page has previously been copied to the first NUMA node based on a remote page table stored in the first NUMA node; and
   perform a local memory access for the additional request based on the determination of whether the first page has been copied.

8. The apparatus of claim 7, wherein the processor is further configured to copy the first page of the second NUMA node in a read sequence.

9. The apparatus of claim 1, wherein the processor is further configured to update, when the access is determined to be a remote memory access outside the first NUMA socket, a remote page table of the first NUMA node to store a physical memory address of the second NUMA node.

10. The apparatus of claim 1, wherein the processor is configured to:
    receive a second access request for second data; and based on determining that the second access request is a remote memory access to another NUMA node in the first NUMA socket, access the second data for the second access request by performing a remote memory access to the other NUMA node in the first NUMA socket.

11. A processor-implemented method, comprising:
generating, by a first NUMA node, an access request for data stored in a memory, wherein the memory is comprised in a non-uniform memory access (NUMA) memory, wherein some of the NUMA memory is provided in a first memory of a first NUMA socket comprising the first NUMA node, and wherein some of the memory is provided in a second memory of a second NUMA socket comprising a second NUMA node;
determining whether the access request is a local memory access;
based on determining that the access request is not a local memory access, determining whether the access request causes a page fault of the first NUMA node;
based on determining that the access request causes a page fault in the first NUMA node, determining whether the access request is a remote access outside the first NUMA socket; and
based on determining that the access request is a remote access outside the first NUMA socket, performing the access request to the data by copying the data onto the first memory of the first NUMA node.

12. The method of claim 11, wherein the data is stored based on a page table.

13. The method of claim 11, wherein the determining of whether the further comprising:
performing, when the access is determined to be a local memory access, the local memory access; and
determining, when the access is determined to not be a local memory access, whether the access request caused a page fault.

14. The method of claim 11, further comprising:
generating an entry in a remote page table and an entry in a page table, wherein the remote page table and the page table both correspond to the first NUMA node; and
allocating a chunk of the first memory of the first NUMA node and copying into the chunk a remote page containing the data.

15. The method of claim 14, further comprising:
receiving a second access request for the data;
based on determining that the second access request is a remote access, determining that the second access request does not cause a page fault, and based thereon performing the remote access request for the second access request by reading the remote page table.

16. The method of claim 11, further comprising:
receiving a second access request for second data; and
determining that the second access request is a remote access to another node in the first NUMA node and based thereon accessing the second data for the second access request from the other NUMA node in the first NUMA socket.

17. An apparatus comprising:
a processor configured to, in a non-uniform memory access (NUMA) memory:
determine, when a requested access of a NUMA node is not a local memory access, whether a page fault of the requested access occurred;
determine, when the page fault of the requested access occurs, whether the requested access is a remote memory access outside a NUMA socket comprising the NUMA node; and
when the requested access is determined to be a remote memory access outside the NUMA socket, allocate, from a local memory of the NUMA node, a remote chunk area for storing copies remote pages from NUMA nodes outside a NUMA socket comprising the NUMA node, and perform the remote memory access of the requested access by copying a corresponding remote page from another NUMA node outside the NUMA socket.

18. The apparatus of claim 17, wherein the processor is further configured to:
when the requested access is determined to be a remote memory access outside the NUMA socket, update a remote page table of the NUMA node with a physical memory address of a node comprised in another socket, the physical memory address corresponding to the remate page copied from the other NUMA node; and
update a local page table of the NUMA node to point to the physical memory address in the remote page table.

* * * * *